MAGNETIC SHIFT REGISTER

Original Filed April 22, 1954 2 Sheets-Sheet 1

INVENTORS
DAVID LOEV
WILLIAM MIEHLE
JOSEPH WYLEN
BY
Lawrence R. Brown
ATTORNEY

INVENTORS
DAVID LOEV
WILLIAM MIEHLE
JOSEPH WYLEN
BY
Laurence R. Brown
ATTORNEY

United States Patent Office 2,943,301

Patented June 28, 1960

2,943,301

MAGNETIC SHIFT REGISTER

David Loev, Plymouth Meeting, William Miehle, Havertown, and Joseph Wylen, Broomall, Pa., assignors to Burroughs Corporation, Detroit, Mich., a corporation of Michigan Continuation of application Ser. No. 425,013, Apr. 22, 1954. This application Sept. 10, 1957, Ser. No. 683,676

5 Claims. (Cl. 340—174)

This application is a continuation of our co-pending application, Serial No. 425,013, filed April 22, 1954.

This invention relates to magnetic switching circuits, and more particularly to magnetic shift register circuits.

Magnetic shift registers are well known in the art as evidenced by published articles such as that entitled "An Electronic Digital Computer" published in Electronic Engineering, December 1950 by A. D. Booth. In general, the static magnetic elements, of which the shift register is comprised, have core materials which display substantially rectangular hysteresis characteristics. These cores tend to remain in a permanent magnetic remanence condition after being driven into magnetic saturation by signals presented at a transformer winding. The two states of magnetic remanence provided by these cores enable them to efficiently store binary information and retain it statically until required. When an element is in one remanence condition, little voltage will be induced in the windings about the transformer by input signals of a polarity tending to establish the same remanence condition in the element. However, when the input signal is opposite in polarity to the storage state within the element, a high voltage is induced and an output signal is afforded by the element. Therefore, when the elements are interrogated with a signal of known polarity, the remanence condition may be determined.

When magnetic elements have a plurality of windings about the core material, then a potential is induced in all of the windings at the time an interrogation signal is applied. Therefore, prior art devices have had to provide asymmetrical circuits or timed gating circuits for distinguishing between desired and undesired output conditions. In addition, the information could be read out of the cores into several circuits at the same time, but not selectively into separate specified circuits coupled to only part of the output windings about a single element. Means for effecting a conditional transfer into a specified circuit by establishing current flow in a transfer loop in response to a transfer signal but not in response to a change of storage state alone is disclosed and claimed in the copending application for Letters Patent of John O. Paivinen, Serial No. 762,863, filed September 23, 1958, as a continuation of three earlier-filed Paivinen applications, Serial Nos. 396,603; and 396,605; filed December 7, 1953, and Serial No. 420,135, filed March 31, 1954, the last being a continuation-in-part of Paivinen application Serial No. 396,604, filed December 7, 1953, each of said Paivinen applications being assigned to the assignee of the present application. Without the use of such conditional transfer techniques, it has been difficult to selectively remove information from either a portion of a shift register circuit or from the entire register. In addition, it has not been convenient to provide serial input-parallel output shift registers in which the information was cleared from the shift register upon parallel read-out.

In serial input-parallel output shift registers of the prior art, it was not practical to provide a circuit effecting parallel read-out directly from the register only in response to a predetermined transfer condition, but rather partial read-out was effected to the parallel read-out circuit periodically upon shifting the serial input information within the register. Not only did the parallel read-out information require some form of timed external gating circuit, but it imposed an additional load upon the shift register advancing circuits when the register was being filled because current was excited in the read-out windings as well as the shift register windings.

It is, therefore, a general object of the invention to improve electronic switching and shift register circuits of the prior art.

It is another object of the invention to provide improved conditional transfer circuits for magnetic shift register systems.

A further object of the invention is to provide efficient serial input-parallel output shift register apparatus.

A still further object of the invention is to provide means for conditionally clearing or erasing a part or all of the information stored in a magnetic shift register.

In accordance with one embodiment of the present invention, therefore, there is provided a conditional transfer network or loop for selectively reading information out of a static magnetic element into different transfer paths in response to corresponding interrogation signals. The conditional transfer is effected by means of establishing an enabling current flow in a split or center tapped winding of a transferee static magnetic element having two branch current paths defined by the two opposed sections of the split winding. With a transfer winding circuit on a transferor element coupled in one branch path, an unbalanced current flow condition may be provided which selectively unbalances the current flow through the split winding when the transfer winding presents a high impedance. This action tends to cause a transfer of the stored information from the transferor element into the transferee element. With unidirectional devices in each branch path, current can be blocked whenever a change of remanence condition occurs in the transferor element during a period when the enabling current flow is absent.

By connecting a shift register circuit with cascade coupled conditional transfer networks of this type, information may be advanced serially in response to a first source of shifting signals. In those transferor register elements from which information is to be read or erased, a second conditional transfer network or loop of the same type is coupled to a circuit external to the register for actuation by a separate source of shifting signals. Therefore, the registers may be cleared without shifting the information to another position within the register. In addition, current is excited in only one transfer loop by the shifting signals and therefore does not provide double loading upon the advancing circuits. Thus, a more efficient and improved magnetic shift register system is provided from which stored information may be selectively transferred and cleared from the register at the same time.

Other objects and features of advantage of the invention will be found throughout the following more detailed description of the invention and its organization. Those features illustrating the invention may be more readily understood when considered in connection with the accompanying drawings, in which:

Figs. 1, 2A, 2B, and 3 are schematic circuit diagrams of magnetic shift registers of the invention employing different conditional transfer loop modifications.

Figure 1:
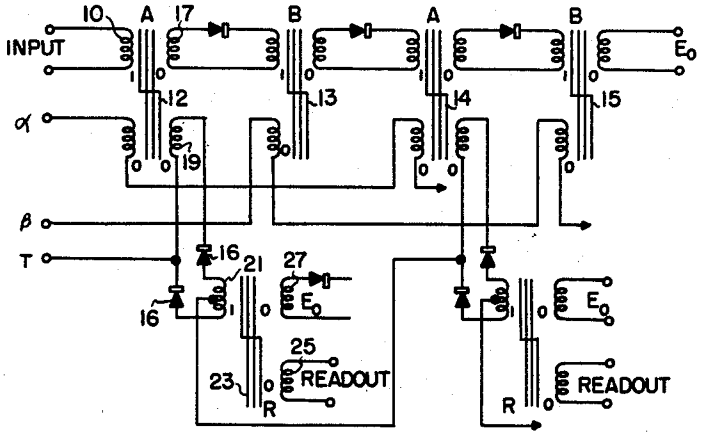

Those features whose details are not of themselves a part of the invention, and which are well known in the art, are shown in block diagram form so that the features of the present invention may be more readily recognized. Throughout the drawings, like reference characters are used to designate similar elements in order to facilitate comparison of the several views.

A typical magnetic shift register constructed in accordance with the present invention is shown schematically in Fig. 1. Four magnetic elements 12 to 15 are shown connected in a conventional magnetic shift register circuit with an input circuit 10 at which binary information may be entered serially into the first magnetic element 12. The magnetic core is shown schematically to have a core of such material that binary magnetic storage of the digits "1" or "0" may be excited by appropriate input signals. The notation at each of the input windings determines which of the states will be established in the element by signals from a circuit connected to the winding. Thus, information at the input winding 10 establishes a "1" state in the element 12. Conversely, the output winding notation signifies that a signal will be generated when the core is returned from an opposite state to that indicated.

The stored information is progressively transferred from element to element along the cascade coupled elements 13, 14 and 15 in response to alternate signals at the respective shift terminals $\alpha$ and $\beta$. The register comprises alternate sets of storage sub-registers designated as elements A and B, wherein the elements B comprise a sub-register for temporary storage of the information in transit from one of the A elements to the next. This is necessary since the information must be removed from one element by reset to a predetermined condition before further information may be entered.

Up to this point the described shift register circuit is conventional. However, with such conventional techniques it is not feasible to efficiently provide parallel read-out signals from the elements in one sub-register such as A. With a conventional circuit, for example, in which a stored binary digit "1" is read out of element 12 by a shift $\alpha$ signal returning the element to its "0" state, a read-out signal current is provided not only in the register winding 17 but also in the parallel read-out winding 19. Therefore, a signal is simultaneously read out into two circuits, and the interrogation signal $\alpha$ must supply enough switching energy to effect this operation. In addition, some type of selectively actuating gating circuits must be provided to prevent the signals read out from entering the read-out register elements R at undesired times while the register is being filled.

By means of the present invention, however, a conditional transfer circuit is provided into which a parallel read-out operation is effected only upon occurrence of a separate transfer interrogation signal T. The primary element of this conditional transfer circuit is a split winding circuit 21 on the transferee element 23. This consists of a transformer winding having a center tap so that an input signal will establish, relative to the center tap, two branch current flow paths setting up opposing magnetic fields in the read-out element 23. When balance is maintained the net flux established is essentially zero and therefore no storage is effected. However, with unbalanced currents, one or the other of the storage states may be established.

Unbalanced currents in the conditional transfer circuit may be established by connecting a read-out winding in only one of the balanced branch current paths so that unbalance is caused only when a signal is stored and read out. Thus, when a T signal reads out a stored "1" from element 12, the current flow in the parallel read-out winding 19 will cause a larger current to flow in the lower half of winding 21 of the transfer loop than in the upper half of the winding, and therefore, will store the "1" in element 23. However, balance is substantially maintained when a "0" is stored in element 12 and the "0" is retained in element 23. If the read-out winding 19 has a large number of turns, say one hundred, as compared with the turns, such as five, of half the split winding 21, the smaller unbalanced current due to the high impedance of winding 19 during transfer will cause read-out of the information in element 12 by a return of the remanence state to "0," thereby shifting the information to element 13 by way of the conventional unconditional shift register transfer loop.

In this embodiment, therefore, the shift register is not cleared but the information is shifted one place along the register and is there retained for further use, if desired. With a shift operation in response to an $\alpha$ interrogation signal at element 12, the voltage induced in read-out winding 19 cannot cause current flow in the conditional transfer loop because of the current blocking rectifiers 16. Thus, the information is only transferred into element 13 and is not gated into element 23. It is clear that when the shift operation is performed no transfer of the stored information is effected into the read-out element 23. Accordingly, the presently described circuit not only provides more efficient operation, and a selective gating of the parallel read-out signal when desired, but in addition, affords means for obtaining non-destructive read-out of a shift circuit.

Read-out of the information in element 23 is effected by conventional means such as establishing a "0" state in the element with read-out winding 25 thereby providing an output signal $E_0$ at output winding 27. The signal $E_0$ appearing at the output winding 27 is provided only at the time the element is switched from a "1" condition to a "0" condition because of the asymmetrical rectifier device in series with the winding. This rectifier is optional and need not be used where the output circuit itself is discriminatory to the switching direction, or where output signals in response to switching in both directions are not undesirable. Either input condition "1" or "0" may be established in a given element by properly choosing the direction of current flow through the input or read-out windings 10 or 25 respectively.

Figures 2A, 2B:
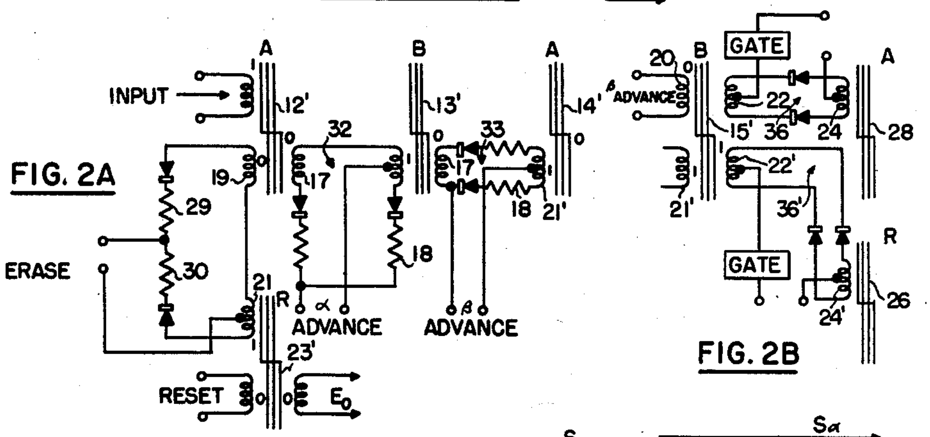

Another conditional transfer shift register embodiment of this invention is shown in Fig. 2A. In this embodiment conditional transfer loops are used both to afford cascade coupling along the elements of the shift register and from elements A of the shift register to the corresponding elements R of a read-out register. If a single read-out element 23' is employed, the circuit parameters may be chosen to selectively erase the information from element 12' without transferring it along the shift register circuit. Therefore, an automatic clear circuit is provided which is suitable for either modifying information in the register, or clearing the register for further operations after read-out without the provision of a specific reset operation. In this case the read-out winding 19 is proportioned so that current flowing in the circuit in response to an erase pulse may flow through the transfer winding 19 and reset element 12' to "0" at the same time that element 23' is switched to a "1" storage state by current flow through the lower half of the split winding 21.

Several different modes of coupling this type of conditional transfer circuit are shown in the respective transfer loops 32 and 33. In the transfer loop 32 the asymmetrical diodes and resistors are coupled in series with one lead connecting the ends of the respective read-out and balanced winding circuits. The operation of this circuit is equivalent to the operation of the transfer loop 33 where the resistors and diodes are connected respectively in each of the leads coupling the read-out and balanced winding circuits. The resistors are employed as a precautionary measure to assure a balanced current flow condition in the balanced winding circuit even though small circuit variations or differences of a few turns in one of the windings might otherwise cause a small unbalance. In addition, the resistance of output winding 17 in one currnet branch may be compensated for by resistor 18 in the other branch, if desired. Operation of the circuit may be effected without the resistors, if desired, and in this case the split winding 21′ of the transfer loop 33 may be unbalanced for compensation if necessary. In addition, the shifting or advancing pulses $\alpha$ and $\beta$ may be applied serially through several windings as shown in Fig. 1, or in parallel to all of the windings as implied in Fig. 2A. With the conditional transfer circuits herein described, operation of magnetic storage elements of this type is made extremely flexible and reliable.

In Fig. 2B the read-out or advancing winding 20 upon the B shift register element 15′ is isolated from the transfer loops 36 and 36′. Thus, a transfer of the information of either binary state residing in element 15′ is effected if current is flowing in the transfer loops 36 and/or 36′ at the time the core is switched. With the element 15′ in a static state the current $i$ will flow equally in each half of the balanced winding circuits of transfer loops 36 and 36′ thereby affording opposing flux which will not disturb the stored information. However, if switching takes place in the element 15′ a potential will be induced across the entire split winding 22 or 22′ of each transfer loop 36 and 36′, which will aid current flow in one half and oppose current flow in the other half. The direction of current flow in the transferee element windings 24 or 24′ will depend upon the direction of the switching, and therefore information of either binary state may be transferred from element 15′. To effect conditional transfer at any time to either read-out element 26 or register element 28, the current in the transfer loops 36 and 36′ may be gated.

Figure 3:
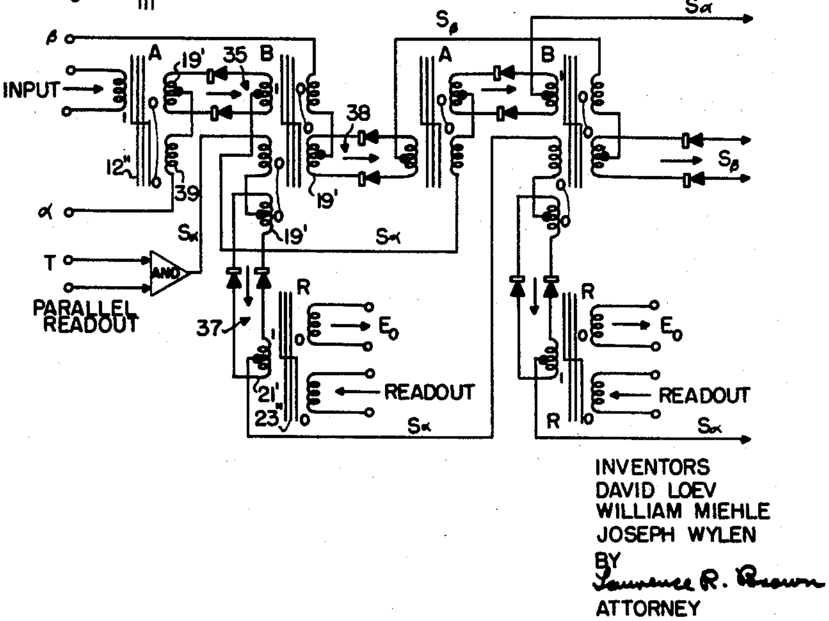

A further alternative circuit connection is shown in Fig. 3 wherein split windings are employed on both the transferor and transferee elements of the transfer loops 35. In this case, an unbalancing winding 39 is employed on the transferor element for causing unbalanced current flow in the branched paths of transfer loops 35 only in response to selectively applied shifting or advancing currents $\alpha$, $\beta$ or T occurring with a change in the remanence state, and not in response to the mere change of remanence state of the cores. The respective shifting currents $\alpha$ and $\beta$ in this embodiment are coupled serially through those windings connected by leads identified $S\alpha$ and $S\beta$. The "0—0" notation at the transferor winding 19′ indicates that an output signal is effected when the element is changed from a "1" to a "0" condition by current flowing in the winding 39. In considering the B sub-register elements, from which a parallel transfer is effected, it is seen that the eyebrow connection lines between the respective 0's of the balanced winding circuits indicate the condition which must be established to effect transfer of information uniquely in one or the other of the transfer paths 37 or 38. In this type of transfer circuit, as before, the changing of the storage state of an element will not cause current flow in the transfer loop because of the series diodes which prevent the transfer of information along any one of the transfer loops in which current is not flowing in response to a specific transfer current signal. When current flows through the center tap of the balanced winding circuits, however, it may travel in either of two branches. The read-out winding 39 switches the magnetic state to induce a potential in the entire split winding which will cause one half to aid and the other half to oppose the current flow. Therefore there will be one branch in which the current may pass more readily than the other during the switching period, which results in transferring the stored information to the succeeding element. Several different embodiments or modifications of the conditional transfer circuits have been shown in order to enable those skilled in the art to adapt the present invention to any particular system application. It is, however, clear that further embodiments may be employed without departing from the spirit or scope of the present invention.

Figure 4:
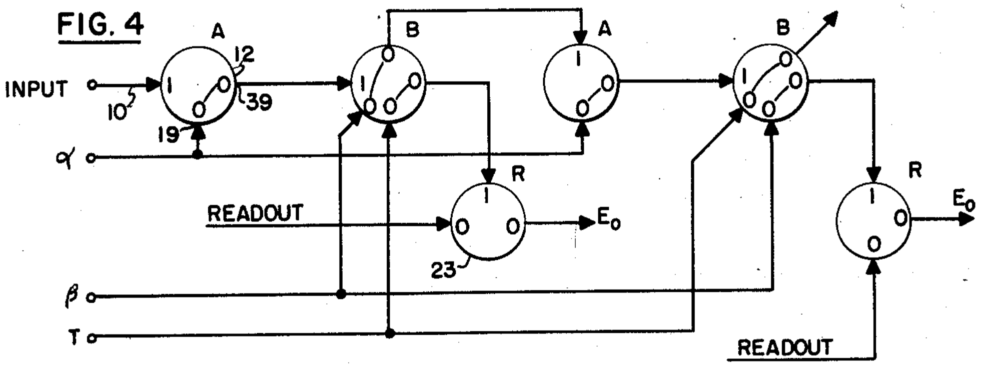
Fig. 4 is a logical circuit diagram of conditional transfer shift register circuits constructed in accordance with the invention.

In order to simplify the logical presentation of the conditional transfer circuits hereinbefore described, a logical diagram notation of a conditional transfer shift register circuit has been derived as shown in Fig. 4. The static magnetic elements are shown as circles at which input arrows represent windings to which input signals are presented. The designation of either a 0 or a 1 at the end of the input arrows represents the condition to which the element is switched or retained when a signal is present. Conversely, output windings are represented by lines leaving the elements, and the notation determines the condition to which the elements must be switched from the opposite condition in order to provide output signals. The eyebrow notation such as between the designation of input and output windings 19 and 39, is used generically to denote the conditional transfer type circuits shown and described in Figs. 1, 2A, 2B, and 3. The block diagram of Fig. 4 therefore corresponds to the schematic circuit of Fig. 3 wherein conditional transfer circuits are used both between the cascade coupled elements A and B of the shift register and between the sub-register B elements and the readout elements R.

Figure 5:
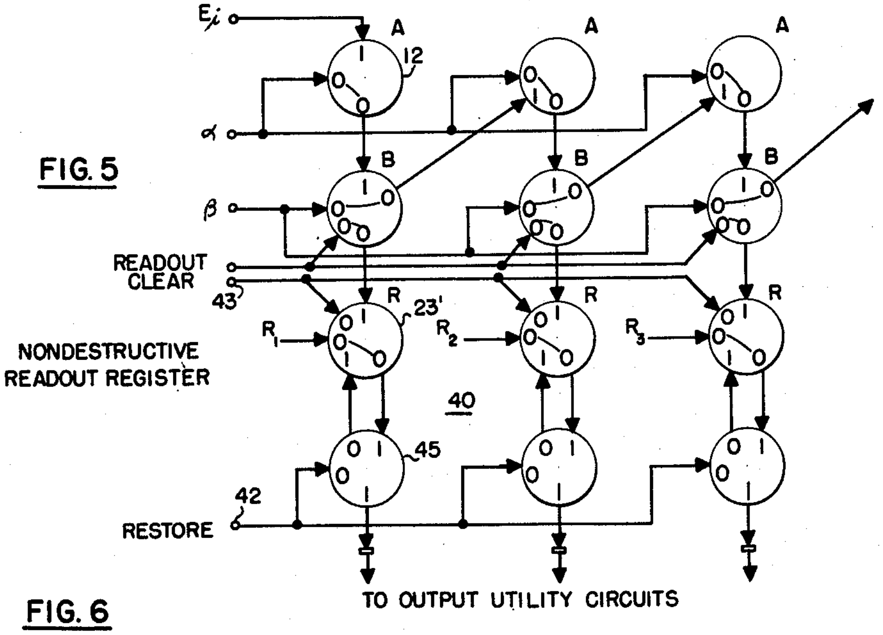
Fig. 5 is a logical block diagram of a non-destructive serial input-parallel read-out register system constructed in accordance with the invention.

A similar logical diagram of a serial input-parallel read-out register is shown in Fig. 5. In connection with a read-out register of the type shown in Fig. 1, where the information is retained after parallel read-out, information may not be read into the register at the time the information is being read out of the parallel read-out circuit, and the information in the register is shifted to a new position in the register upon read-out. To free the shift register for receiving new information while the information which has been read out in parallel is used non-destructively, the non-destructive read-out register generally indicated at 40 in Fig. 5 is employed. Such a non-destructive read-out register is described and claimed in copending application of William Miehle (one of the joint inventors of the present application), Serial No. 791,002, filed January 30, 1959, as a continuation of his earlier application Serial No. 407,120, filed January 29, 1954, and assigned to the assignee of the present application. This register utilizes the conditional transfer circuits hereinbefore described. As information is read out of the serial input register in parallel from the sub-register elements B, it is stored in the non-destructive read-out register elements R. The conditional transfer circuit which reads out information from the shift register operates as a gating circuit, thereby preventing any further alteration of information in the non-destructive read-out register elements R as information is sequentially read serially into the shift register elements. Therefore, effective means is provided for gating signals from a serial shift register circuit to a parallel read-out circuit by means of the present invention.

The non-destructive read-out register is also provided internally with conditional transfer circuits which may be excited by the respective $R_1$, $R_2$, etc. read-out pulses. As one of these respective read-out pulses is provided at any one of the R cores such as 23′, the information is transferred to the associated element 45 in the lower group of elements of the read-out register 40. At the time of transfer into element 45 an output signal may be provided to suitable output utility circuits, if desired. In this manner, all the $R_1$, $R_2$, etc. leads may be pulsed in parallel for parallel utilization of the information therein, or conversely they may be pulsed in any order or sequence in order to partially use the information or to use it in sequence. By means of a conventional shift winding, the information is restored into the upper elements by restore commands at terminal 42. Clearing this register may be done by the simple expedient of passing current through a conventional winding on the upper read-out register elements $R_1$, $R_2$, etc. Clear pulses at terminal 43 change the states of the cores without reading the information out because of the conditional transfer circuits within register 40. The clearing operation is thus accomplished much more simply and efficiently, since less power is required than when inhibit pulses are additionally used to prevent the entering of information in the lower read-out register elements at the same time that it is cleared from the upper elements R. The clearing operation should be performed in time sequence with the restoring operation in order to assure that all the stored information is returned to register elements R for clearing.

Figure 6:
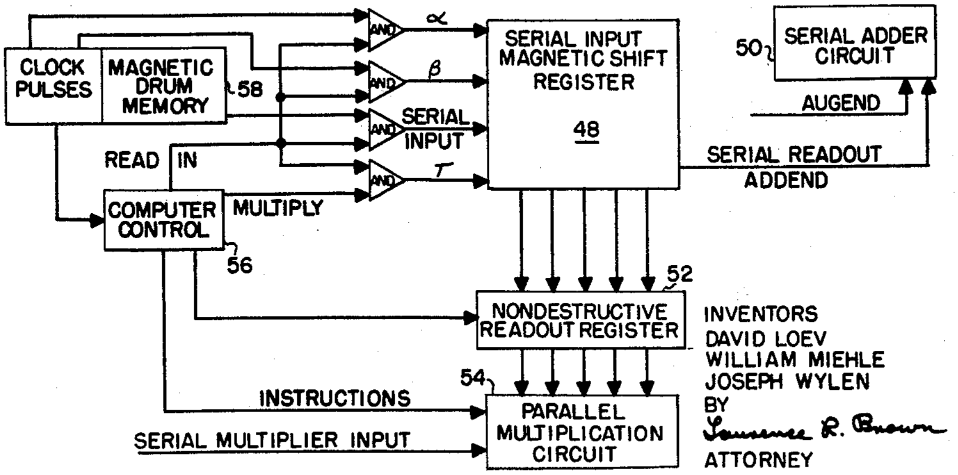
Fig. 6 is a block diagram of a portion of a digital computer arithmetic system incorporating means provided by the present invention.

Serial input-parallel output registers of the type described are highly useful in arithmetic units of electronic computers, such as that shown by block diagram in Fig. 6. In an arithmetic unit designed for serial addition, it is desirable to afford parallel multiplication when attempting to keep the elapsed time for each arithmetic operation as constant as possible. Should the multiplication be effected in serial, many operations would be required and the multiplication time would be much longer than the addition time. Therefore, the serial input magnetic shift register 48 is provided for serial output into an adder circuit 50. However, for multiplication, parallel read-out is provided into the non-destructive read-out register 52, which is used to selectively excite the parallel multiplication circuit 54 in response to multiplication instructions emanating from the computer control circuits 56. Input signals may be taken from a memory storage device such as a magnetic drum 58 from which timing or clock pulses are derived in order to effect operation in the proper time relationship. Wherever the clock pulses are used to effect timing of a particular operation, logical "and" circuits are inserted which require both a command signal and a clock signal for passing information. The organization of this type of computer circuit is well known in the art, and the details of the computer arrangement itself are not part of the present invention. The diagram, however, typifies apparatus in which the circuits of the present invention are advantageously employed.

Having therefore described the invention and its organization, it is requested that Letters Patent be granted on the appended claims, which are believed descriptive of those novel features contributed to advance the state of the art.

What is claimed is:

1. A magnetic storage system comprising a magnetic shift register including a plurality of magnetic storage elements, electrical circuitry interconnecting successive storage elements of the shift register for transferring information from element to element therealong, and separate electrical circuitry coupled to the last storage element of the shift register for interconnecting said element to a load; first transfer means within the register for advancing information serially from element to element in response to a signal from a first source; a transfer loop coupled to the register for conditionally reading, in response to a signal from a second source, information out of at least one transferor element of the register and into a transferee circuit external of said shift register, said transferee circuit having at least one transferee element, said transfer loop coupling said transferor element and said transferee element and comprising a pair of substantially balanced branched current flow paths for receiving a flow of current from said second signal source for providing a net flux of sufficient magnitude in said transferee element in response to said current flow only upon dynamic switching of the transferor element to cause switching of the transferee element; and means in said transfer loop for preventing current flow through said loop in response to a change of flux in said transferor element in the absence of a signal from said second source.

2. A system as defined in claim 1 wherein the pair of branched current flow paths includes on each the transferor element and the transferee element one portion of a winding having a mid-tap, and a read-out winding on the transferor element serially connected with said mid-tap to receive the total current flowing in the branch circuits.

3. In combination; a binary register adapted for series-input parallel-output operation and comprising a plurality of bistable elements coupled in cascade formation, input means for inserting binary data into said register, and shift means for shifting said data through said register in step-by-step manner; a plurality of bistable output elements; and a conditional transfer loop coupling each of said output elements to a different one of said register elements, each of said conditional transfer loops including: an output winding associated with said register element, a center-tapped input winding associated with said output element, a pair of asymmetrically conducting devices poled to inhibit current flow around said loop, and means for connecting a source of pulse current between the center-tap on said input winding and a point on said loop located between said asymmetrically-conducting devices, thereby to establish parallel current-flow paths between said register element and output element, said asymmetrically-conducting devices operating to inhibit transfer of data from said register element to said output element in the absence of said pulse current, whereby data may be inserted serially into and shifted through said register without developing signals in said output elements, and whereby said register data may be transferred from selected register elements to associated output elements in response to the application of a pulse of current to the conditional transfer loop coupled therebetween.

4. In combination; a shift register comprising: a plurality of magnetic cores each capable of assuming either of two stable states of magnetic remanence, an input winding on a first of said cores for receiving input data signals, transfer loops coupling said cores in cascade formation, and shift-current means for shifting the received data signals serially through said register and out of the last core of said cascade formation; a plurality of bistable magnetic output cores external of said register; a separate conditional transfer loop coupling each of said output cores to a different one of the cores of said register, each of said transfer loops including an output winding on the register core, an input winding on the associated output core having a tap at its mid-point, a pair of diodes poled to inhibit current flow around the transfer loop, and means for connecting a source of enabling pulse current between said input-winding tap and a point on said loop located between said diodes, thereby to establish parallel current-flow paths between the register core and the associated output core, whereby data stored in the register core is transferred to the output core by way of one of said parallel current-flow paths and only in the presence of said enabling pulse current.

5. Apparatus as claimed in claim 4 characterized in that the said transfer loops which couple the cores of the shift register in cascade formation are likewise conditional transfer loops and include an output winding on one register core, a mid-tapped input winding on the next register core, and a pair of diodes poled to inhibit current flow around the register transfer loop; and in that the said shift-current means includes means for connecting a second source of enabling pulse current between the said mid-tap point on said register-core input winding and a point on said register transfer loop located between said last-named diodes, thereby to establish parallel current-flow paths between the said one register core and the said next register core, whereby data stored in the said one register core is transferable to the said next register core by way of one of said parallel current-flow paths and only in the presence of a pulse of enabling current from said second source.

References Cited in the file of this patent

UNITED STATES PATENTS

| | | |
|---|---|---|
| 2,719,773 | Karnaugh | Oct. 4, 1955 |
| 2,769,925 | Saunders | Nov. 6, 1956 |
| 2,832,951 | Browne | Apr. 29, 1958 |

FOREIGN PATENTS

| | | |
|---|---|---|
| 768,389 | Great Britain | Feb. 13, 1957 |